United States Patent Office 3,716,831
Patented Feb. 13, 1973

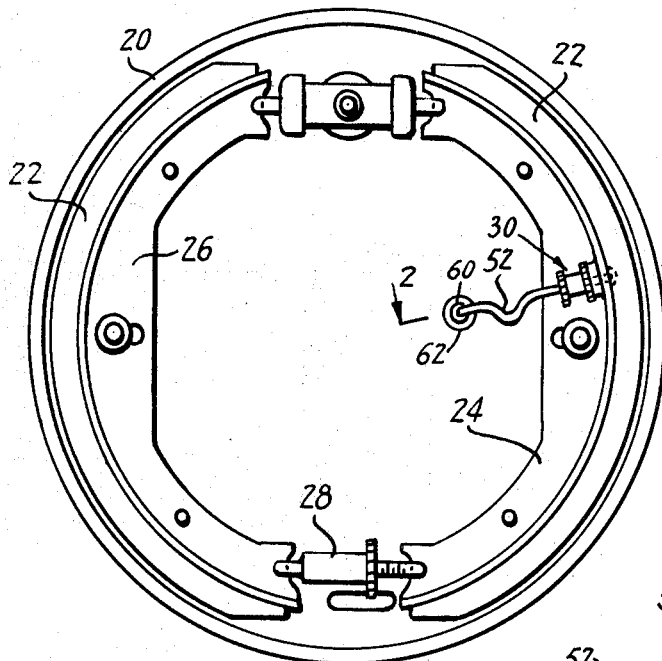
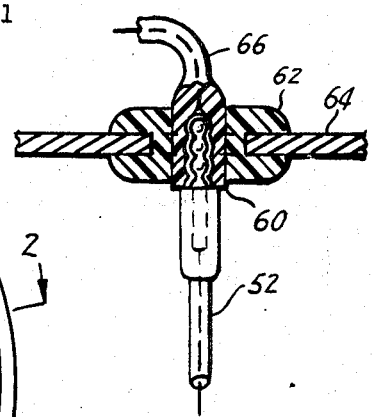
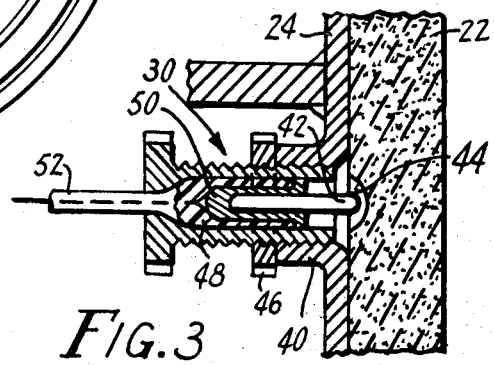
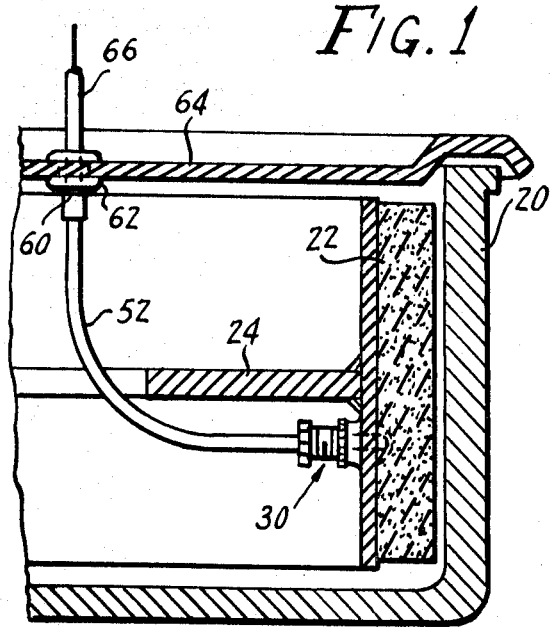
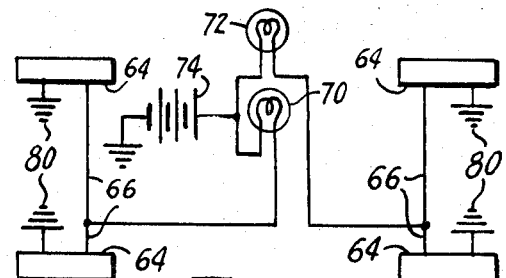
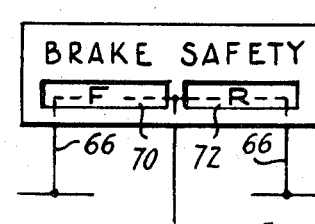

3,716,831
WORN BRAKE INDICATOR
Jackie D. Rikard, 2529 N. Bell St., and Bobby G. Rikard, Rte. 6, both of Kokomo, Ind. 46901
Filed Mar. 23, 1971, Ser. No. 127,132
Int. Cl. B60t 17/22
U.S. Cl. 340—52 A                    1 Claim

ABSTRACT OF THE DISCLOSURE

A contact switch assembly mounted to a brake drum and connected to a warning light panel for indication of brake wear when the brake lining wears to a point where the contact switch assembly is exposed to the brake drum.

---

This invention relates to signaling devices for warning vehicle operators of the condition of their brakes. It is commonly known that in this day and age different brake systems, due to automatic transmissions and self-adjusting brakes, have brake linings with a decreased life expectancy especially when the vehicle carries heavy loads. Worn brake warning devices of the past have been more complex and limited in application as well as subject to various pitfalls. Some have used various fastening methods which were impractical while others used bonding rivets or fastening the device utilizing the rivet holes and connections themselves for fastening the device thereby incorporating the device to help hold the lining to the brake shoe. However, due to tremendous heat and brake shoe expansion and contraction and also brake shoes shaddering as brakes are applied, rivets could tend to loosen and break away from bondings to the shoe thus making the device useless in warning the vehicle operator.

Accordingly, the primary object of this invention is a simple and economical device for warning a vehicle operator of brake wear.

Another object of this invention is a device that withstands all braking heat conditions for the duration of its life.

Another object of this invention is a device which will withstand vibrations, corrosives, and chemicals used for road deicing as well as weather conditions for the life of the device.

A further object of this invention is the provision of a reusable switch minimizing part replacement when the brake linings have worn to the danger point.

Lastly, it is an object of this invention to provide a device which is adaptable to all types of vehicles and brakes including disk brakes through the use of one standard adjustable contact switch so that the device can be installed on vehicles, aircraft, and any other types of machinery using brake shoes and linings.

The above and other objects of this invention will become apparent to those skilled in the art after a consideration of a detailed description of a preferred embodiment of this invention taken together with the accompanying drawing wherein:

FIG. 1 is a side elevational view of a brake;
FIG. 2 is a sectional view taken on the line 2—2 of FIG. 1;
FIG. 3 is a cross-sectional view of the switch assembly;
FIG. 4 is a cross-sectional view of a circuit connection and attachment to the brake;
FIG. 5 is a schematic view of the circuitry; and
FIG. 6 is a front elevational view of the warning indicator light on the vehicle panel.

Referring in detail to the drawing, there is shown a rotating brake drum 20, a pair of brake shoe linings 22, a rear brake shoe 24, a front brake shoe 26, a pivot pin or brake adjuster 28 to which brake shoes 24 and 26 are connected, and a contact switch assembly 30 mounted to rear brake shoe 24.

FIG. 3 clearly shows a raised threaded bore 40 extending from one side of brake shoe 24 to the other. Insertable within bore 40 is switch assembly 30 which has an outer cylindrical threaded surface mating with the inside threads of bore 40. A contact pin 42 is secured within assembly 30 and extends outward from assembly 30 and bore 40 into an opening 44 in the surface of brake drum 22. The extent to which contact pin 42 protrudes is adjustable by means of a locking nut 46 threaded on assembly 30 and securing it at the desired depth within bore 40. Pin 42 is embodied along a portion thereof within a heat resistant fire-proof type insulation 48 within assembly 30. Also embodied within insulation 48 is a female contact pin connection 50 which is connected to a flexible heat resistant fire retardant type woven cable 52.

FIG. 4 clearly shows that cable 52 leads to a connection 60 secured within a rubber grommet 62 mounted in a hole in the backing plate 64. Cable 66 leads from connection 60 to a warning light panel 68 which will be subsequently described in connection with FIG. 6.

When brake shoe lining 22 wears to the extent that brake drum 20 makes contact with pin 42, a closed circuit is formed which is best seen by referring to FIG. 5. Cable 66 leads from each back plate 64 of the brakes for the front wheels of the vehicle to a front indicator light 70 located on the dashboard panel as shown in FIG. 6. Cables 66 leading from back plate 64 of the brakes of the rear wheel of a vehicle are connected to rear indicator light 72 designated R in FIG. 6. Lights 70 and 72 are connected on the other end to the positive side of a battery 74 which in turn is connected to ground on the negative side thereof. Since brake drums 20 are also grounded at points 80, a close circuit will develop when pin 42 contacts brake drum 20 and one of the front or rear wheels of the vehicle thereby lighting up either light 70 or light 72 as the case may be.

It should also be noted that the only part that has to be replaced in addition to the worn linings is contact pin 42 in contrast to other devices which have to replace the total switch assembly and possibly part of the wiring in instances.

While a preferred embodiment of this invention has been illustrated and described, it should be understood by those skilled in the art that many changes and modifications may be resorted to without departing from the spirit and scope of this invention.

What is claimed is:

1. A worn brake indicator, comprising a grounded brake drum, a brake shoe and a brake lining extending therefrom toward said brake drum, said brake lining having an indentation in the surface thereof abutting the surface of said brake shoe, a boss integrally formed on the inner surface of said brake shoe opposite said brake lining, a threaded bore extending axially through said boss and said shoe, an externally threaded generally cylindrical switch body adjustably and demountably threaded into said bore, means threaded onto an exposed end of said body for engagement with said boss to lock said body to said shoe in any adjusted position, an electric cable secured to said body, a femal connector mounted in said body and insulated therefrom and electrically connected to said electric cable, a metal contact pin detachably mounted in said connector and extending into the indentation in said brake lining a distance controlled by the adjustment of said body, a warning indicator connected to said electric cable, and a grounded power source connected at the opposite side thereof to said warning indicator for energizing said indicator upon the wearing of said brake lining to the extent where said grounded brake drum makes physical and electric contact with said contact pin.

References Cited

UNITED STATES PATENTS

| 2,146,357 | 2/1939 | Schweikle | 350—52 A X |
| 2,814,684 | 11/1957 | DePascale | 340—52 A |
| 2,217,176 | 10/1940 | Madison | 340—52 A |
| 3,297,985 | 1/1967 | Trebonsky et al. | 340—52 A X |

ALVIN H. WARING, Primary Examiner

U.S. Cl. X.R.

200—61.4